United States Patent [19]

Marshall et al.

[11] Patent Number: 5,696,679
[45] Date of Patent: Dec. 9, 1997

[54] INTEGRATED ELECTRONIC CONTROL OF PAWL-GEAR PARK FUNCTION OF AN AUTOMATIC TRANSMISSION

[75] Inventors: Charles Edward Marshall, Novi; Eldon LaMar Goates, Livonia, both of Mich.

[73] Assignee: Ford Global Technologies, Inc., Dearborn, Mich.

[21] Appl. No.: 488,524

[22] Filed: Jun. 9, 1995

[51] Int. Cl.[6] ............... G06G 7/70; B60K 41/20
[52] U.S. Cl. ............... 364/424.082; 364/426.01; 364/423.098; 477/906; 477/907; 477/92; 477/94; 74/411.5; 192/4 R; 192/7; 192/8 R
[58] Field of Search ............... 364/426.01, 424.034, 364/424.039, 424.082, 423.098; 340/456, 430; 303/9.61, 10, 13; 477/906, 125, 92–98, 121, 130, 131, 907, 188, 40; 192/4 A, 41 R, 3.51, 4 R, 7, 8 R, 9, 6 R, 8 C; 475/131, 123, 128; 74/473 R, 475, 335, 336 R, 89.15, 471 XY, 477, 529, 540, 471 R, 411.5

[56] References Cited

U.S. PATENT DOCUMENTS

| | | | |
|---|---|---|---|
| 4,513,847 | 4/1985 | Hansen | 192/4 A |
| 4,790,204 | 12/1988 | Tury et al. | 74/483 PB |
| 4,817,471 | 4/1989 | Tury | 477/125 |
| 4,841,793 | 6/1989 | Leigh-Monstevens et al. | 74/335 |
| 4,843,901 | 7/1989 | Peterson et al. | 74/335 |
| 4,922,769 | 5/1990 | Tury | 477/125 |
| 4,979,783 | 12/1990 | Johnson | 192/4 A |
| 5,111,921 | 5/1992 | Marks et al. | 192/4 A |
| 5,180,038 | 1/1993 | Arnold et al. | 192/4 A |
| 5,489,246 | 2/1996 | Moody et al. | 192/4 A |
| 5,490,585 | 2/1996 | Togano | 192/4 A |
| 5,505,674 | 4/1996 | Furukawa et al. | 477/906 |

OTHER PUBLICATIONS

"Electronic Shift For Automatic Transmissions (ESAT)", David C. Peterson et al, SAE Technical Paper No. 900560, Feb. 26–Mar. 2, 1990.

"Asian Editor Jack Yamaguchi Examines The Vehicles Displayed At The Recent Auto Show", Automotive Engineering, Feb. 1994, pp. 39–40 Stuart Birch et al.

"30 Development Of A Quick And Accurate DC Motor Shifting Device For Automatic Transmissions", JSAE Proceedings 9432796 1994–5 (117–120) Jan. 1994 Furukawa et al.

Primary Examiner—Jacques Louis-Jacques
Attorney, Agent, or Firm—Frank G. McKenzie; Roger L. May

[57] ABSTRACT

An electronically actuated park control system for an automatic transmission for a wheeled vehicle including a transmission range selection control assembly that sends to a powertrain control module a park signal, the module being adapted to deliver an output signal to a park controller circuit for actuating electric actuator motors which activate a mechanical transmission park mechanism, the motors having position feedback monitoring features as the transmission park mechanism is engaged or disengaged, the controller and the park controller circuit having inherent design redundancies as well as independent watchdog circuitry that ensure that transmission park release or park application responds precisely to transmission range selector requests by the driver.

8 Claims, 6 Drawing Sheets

INTEGRATED ELECTRONIC CONTROL OF PAWL-GEAR PARK FUNCTION OF AN AUTOMATIC TRANSMISSION

TECHNICAL FIELD

The invention relates to transmission park control systems that do not require a mechanical linkage between the transmission park pawl-gear mechanism and the driver-operated range selector.

BACKGROUND OF THE INVENTION

We are aware of electronic shift control systems for automatic, automotive transmissions that provide remote control of a transmission parking brake park pawl-gear mechanism in response to driver commands without the requirement for using a mechanical linkage between a driver-controlled range selector lever and the transmission. One such electronic shift control system is described in SAE Technical Paper 900560, entitled "Electronic Shift For Automatic Transmissions," by David C. Peterson and Keith V. Leigh-Monstevens, dated Feb. 26–Mar. 2, 1990.

The shift control system described in that SAE Paper represents an early advancement in the state-of-the-art. Earlier shift systems employed mechanically-operated push button linkages for controlling movement of a ratio selecting valve in the transmission and for controlling movement of a transmission park brake into and out of engagement. Such mechanical push button control systems, which were adopted subsequent to the introduction of hydrokinetic torque converter transmissions in the automotive industry, are somewhat erratic, difficult to install and expensive to manufacture. They also have a relatively short product life. The electronic shift system described in the SAE Paper, in contrast, includes a push button module for developing command signals for a microcomputer that compares the desired gear with the actual gear in effect. It develops an output signal in the form of voltage to a 12-volt DC motor which drives a linkage for the transmission park pawl-gear mechanism.

BRIEF DESCRIPTION OF THE INVENTION

The present invention has features that are common to the electronic shift system of the SAE Paper, but it is characterized by redundant controls that accurately respond to driver commands to ensure that the transmission will not be out-of-park when the driver selects the park position. The vehicle thus will not be unsecured after a park mode is commanded by the vehicle operator. The improved system of the invention will ensure also that the transmission will not come out-of-park following engagement of the transmission park pawl-gear mechanism after the driver has selected the park mode.

The invention furthermore will ensure that appropriate error codes and warning signals are developed to signal and identify a failure of any component in the electronic shift system. It is characterized by either double redundancy or triple redundancy features that ensure that the transmission park pawl-gear can be released when the driver commands a release and that the transmission park pawl-gear engage mode will be entered and retained when the driver has commanded the engage mode.

PARTICULAR DESCRIPTION OF THE INVENTION

Figure 5:
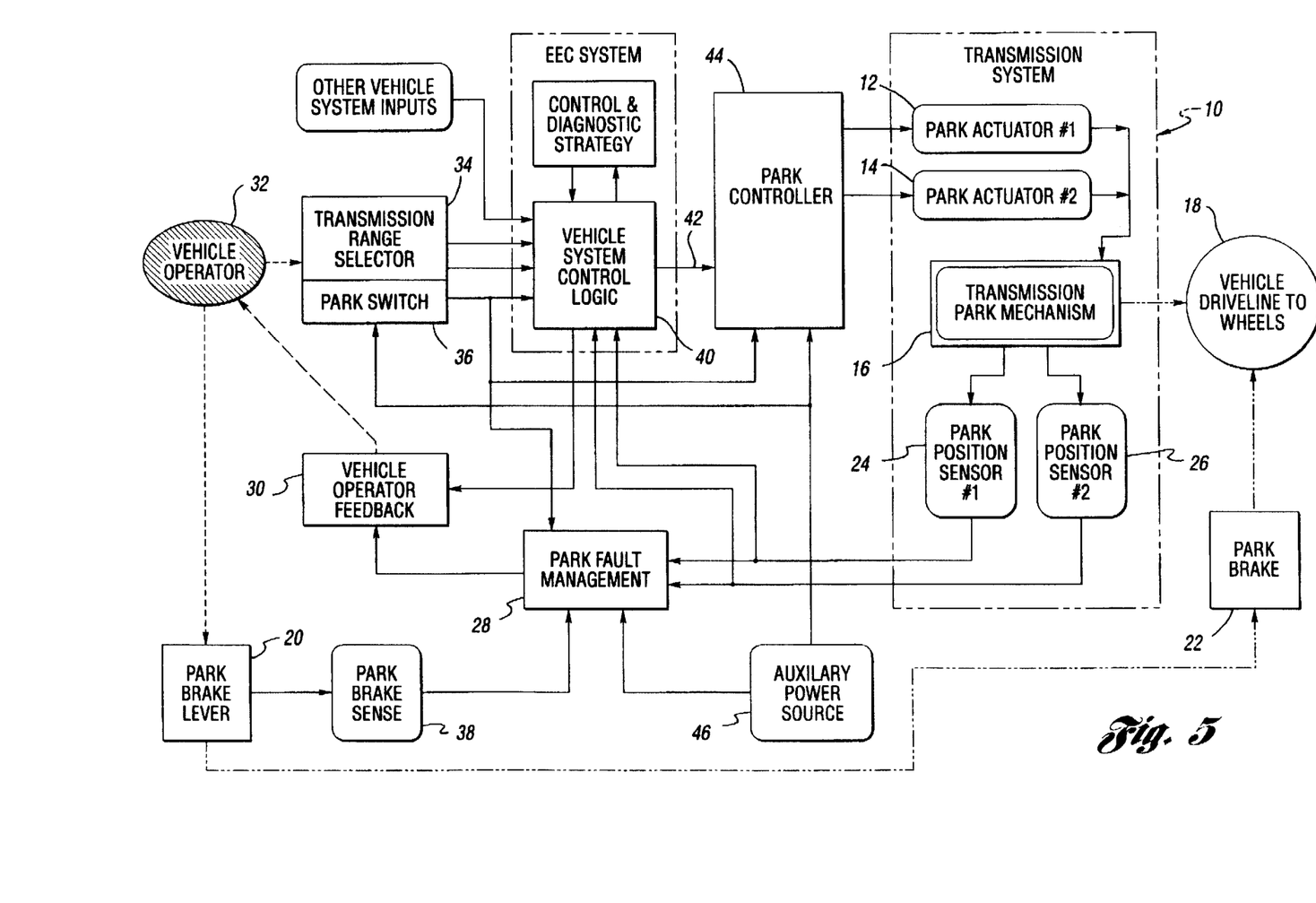
FIG. 5 is a simplified schematic drawing of an electronically actuated transmission park pawl-gear system having features that are shown in more detail in FIGS. 1 and 2.

In FIG. 5, the transmission system is schematically illustrated at 10. It includes first transmission park pawl-gear actuator 12 and second park actuator 14 which act in tandem in a redundant fashion to operate a transmission park pawl-gear mechanism shown schematically at 16. The actual construction of the pawl-gear mechanism will be described subsequently with reference to FIG. 3.

The pawl-gear mechanism for the transmission locks and releases the power output shaft of the transmission, which delivers torque to the vehicle driveline and the traction wheels as schematically indicated at 18.

A vehicle wheel park brake, which is actuated by a driver controlled brake lever 20, frictionally holds the vehicle wheels. The vehicle wheel park brake, which is controlled by the park lever 20, is shown in FIG. 5 at 22.

The position of the actuator motors associated with the actuators 12 and 14 is monitored by transmission park pawl-gear position sensors at 24 and 26. The output of the transmission park pawl-gear position sensors is delivered to a fault management circuit 28 and vehicle system control logic 48, which establishes a function feedback path, shown at 30, to the vehicle operator. For purposes of the schematic drawing of FIG. 5, the operator is represented at 32.

The operator controls the transmission range selector sensor 34 in known fashion. When the range selector is moved to the transmission position, a park transmission switch is actuated, the switch being schematically illustrated at 36. Also, the range selector sensor 34 sends a digital code signal to vehicle system control logic. This provides desirable redundancy. Then, when the system power is off and the sensor output of sensor 34 is not present, a signal from transmission park switch 36 still is available by reason of auxiliary battery power, as will be explained subsequently. The fault management circuit 28 detects when the parking brake lever for the vehicle wheels is actuated by means of the output vehicle wheel park brake switch 38.

The vehicle system control logic shown at 40 will detect whether the actual range selector position corresponds to the driver action as the driver actuates the range selector to the park position. If the logic permits, a command signal is issued to the transmission park pawl-gear controller 44, as schematically shown at 42. This in turn controls the operation of the park actuators 1 and 2 in the transmission system 10. The power source for the system is the main vehicle battery, but an auxiliary battery power source also can be provided, as shown at 46 in FIG. 5.

Figure 1:
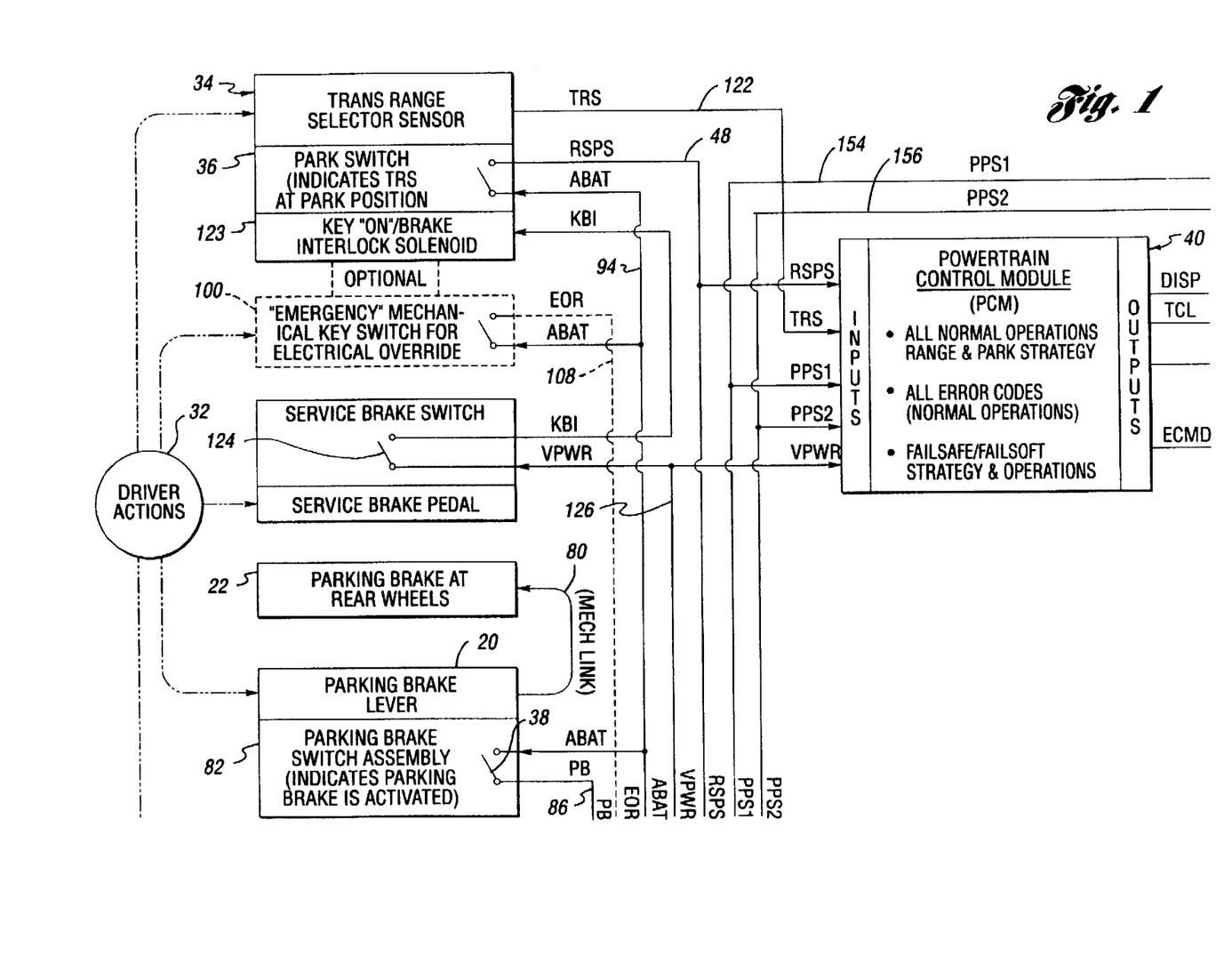
FIGS. 1, 2, 3 and 4, taken together, show in schematic form an electronically actuated transmission park pawl-gear system that incorporates the improvements of our invention.

The electronically actuated transmission control system of the invention engages or disengages the transmission park pawl-gear mechanism by driver action, as indicated by the action block 32 in FIG. 1, using the transmission range selector 34 and pawl-gear switch 36. Signals from these devices identify any change in the transmission selection. These signals are sent to the powertrain control module 40 as inputs. Also, the transmission park switch output is distributed as a signal, RSPS, to the park pawl-gear controller 44, as well as to the powertrain control module 40 and the park transmission fault management circuit 28, as indicated by the function flow path 48. The powertrain control module 40 compares the transmission range sensor and park pawl-gear switch signals to determine if a transmission park request by the operator at 32 satisfies the logic requirements of the powertrain control module 40.

Figure 4:
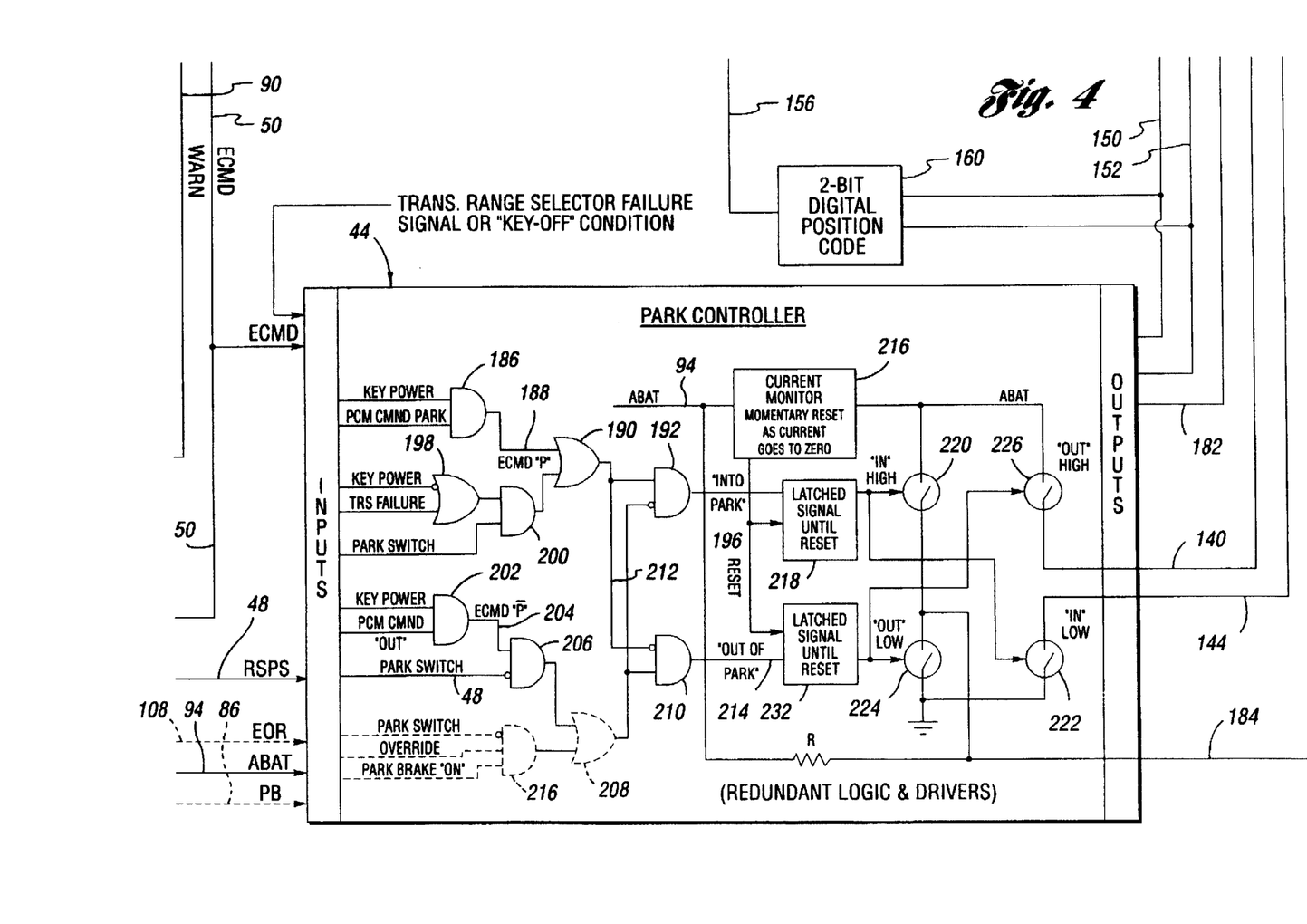

If there are no system faults, the powertrain control module will develop a command signal ECMD at signal flow path 50, which is distributed to the park pawl-gear controller 44, verifying that the transmission park request from the driver is valid. The park controller processes the command signal at 50 and the park pawl-gear switch signal at 48 and monitors the state of the key power; i.e., whether the key power is "on" or "off". Assuming the park logic is satisfied, the actuator motors are turned on by the park pawl gear controller 44 seen in FIG. 4.

The actuator motors 14 and 12 rotate in either the clockwise direction or the counterclockwise direction to move the park pawl-gear mechanism 16 to an "into park" mode or an "out-of-park" mode as requested by the driver. Park position sensors 24 and 26 provide feedback monitoring of the park pawl-gear mechanism travel, as well as providing a "turn-off" of the actuator motors at the end of their rotation.

Figure 3:
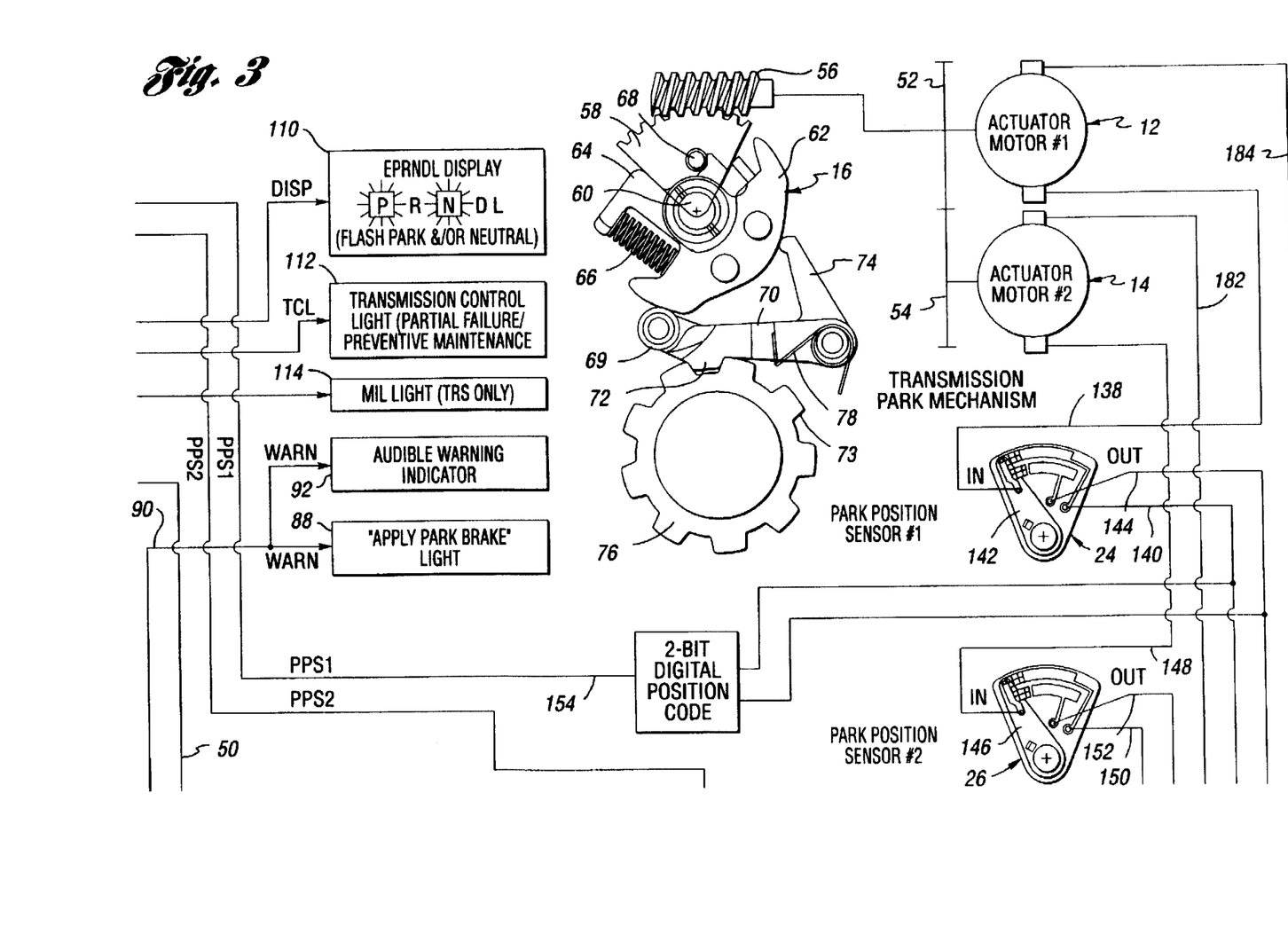

The actuator motors are geared together, as shown at 52 and 54 in FIG. 3, to drive the worm gear 56, which is engaged drivably with a sector gear 58. A transmission park pawl-gear camshaft 60 is driven by the sector gear 58. A park pawl-gear cam 62 is carried by the shaft 60. An extension 64 of the shaft 60 seats a park pawl-gear spring 66, which acts on the cam 62. During normal operation, the cam 62 and the sector gear 58 rotate in unison with the shaft 60.

A cam follower 69 carried by pawl 70 has a pawl tooth 72 that engages tooth spaces 73 on park gear 76, which is secured to the transmission output shaft. A pawl arm 74 is formed integrally with pawl 70. Pawl 70 normally is urged to a disengaged position by pawl spring 78. If the cam 62 is rotated in a counterclockwise direction, the cam follower urges the pawl tooth 72 into a space in the transmission park pawl-gear 76. If the spring 78 should break or if the pawl tooth 72 otherwise fails to move out of engagement with the park gear 76, the extension 74 will be actuated by the cam 62 to disengage the pawl as the cam 62 is rotated in a clockwise direction.

In FIG. 1, the mechanical linkage between the parking brake lever and the parking brake at the traction wheels is shown at 80. The motors 12 and of FIG. 3 provide redundant control by actuating the transmission park pawl-gear mechanism. Each actuator motor has its own "in-series" park position sensor, as shown at 24 and 26, respectively.

The transmission park pawl-gear controller 44 includes park logic that can be designed either as firmware (integrated circuit devices) or as control unit software for microprocessors. If both redundant, electronic actuator motor subsystems fail to achieve an "into park" condition following a command for park, a third redundant parking brake system for the vehicle wheels can be activated. This is shown at 22.

Figure 2:
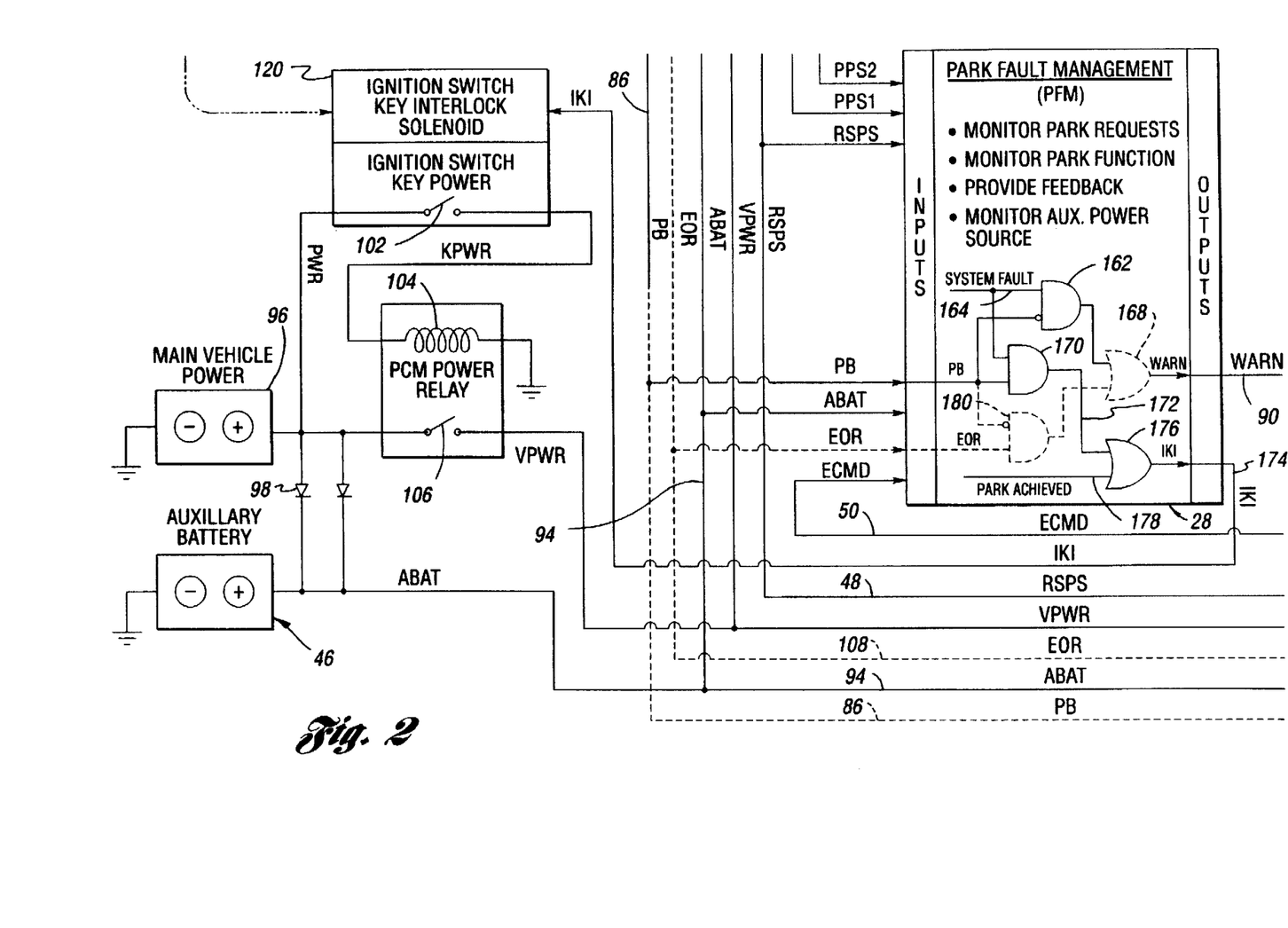

Associated with the parking brake system is a parking brake switch assembly 82 for the vehicle wheel, shown schematically in FIG. 1. The operation of the parking brake mechanism shown at 20 and 82 is monitored by the park fault management device 28. The parking brake signal, which is present when the parking brake switch 38 is closed upon application of the parking brake lever for the vehicle wheel, is distributed through the signal flow path 86 to the park fault management device 28 seen in FIG. 2.

Figure 6:
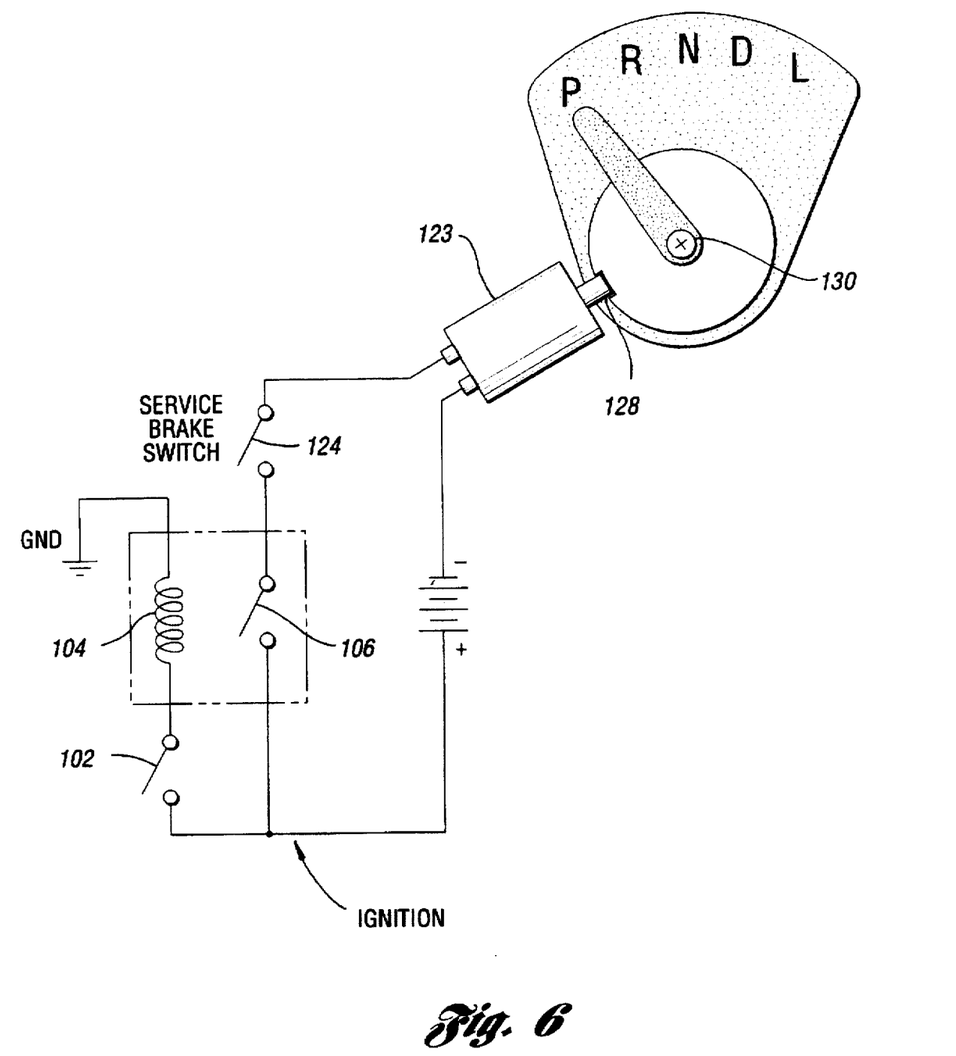
FIG. 6 is a schematic diagram of a brake interlock solenoid for the electronically actuated transmission park pawl-gear system of our invention.

The park fault management device is calibrated to identify a system failure. If a failure occurs, it activates the "apply park brake" light 88 as a warning signal, distributed through signal flow path 90 as seen in FIG. 3. An audible warning device also can be wired in parallel with the warning light 88, as shown at 92. When the parking brake lever 20 for the vehicle wheels is applied, the park brake switch 38 changes state and provides a feedback signal to the park fault management device 28. The park fault management device then turns off the warning at 90 and commands an output to the ignition switch key interlock solenoid, which will be described with reference to FIG. 6, thereby allowing the removal of the vehicle ignition key. During normal operation (no failures), the ignition key is automatically released in this way.

The parking brake switch assembly 82 for the vehicle wheels receives its power from power supply line 94, associated with auxiliary battery 46. If power is available from the main vehicle power source shown at 96, that power source would be used. The auxiliary battery 46 acts as a backup for the battery 96, rectifying diodes 98 being provided for this purpose.

An emergency "out-of-park" feature responds to driver action, as indicated at 100, to establish an override for the ignition switch key power. The ignition switch key power is established by ignition switch 102, which delivers main vehicle battery power from battery 96 to power relay 104 of relay switch 106.

In the event of a failure of the main vehicle battery, the auxiliary battery 46 supplies operating voltage through line 94 to the park fault management circuit 28, to the park controller 44, to the park switch 36, to the parking brake switch 38 and to the emergency mechanical key switch electrical override, as shown as 100. The override switch 100 can be activated, for example, by inserting a vehicle key or similar object. When it is activated, the auxiliary battery line 94 will be connected to emergency override line 108, which supplies an input signal to the park fault management circuit 28 and to the park controller 44. The park controller then may activate the motors 14 and 12 in response to the signal from line 108. If this signal is present when the parking brake is applied and the state of the parking switch changes, as will be explained subsequently, the motors 12 and 14 will be activated, allowing the transmission to go "out-of-park". Fault detector driver feedback is provided by the transmission control light 112, malfunction indicator light 114, the previously described apply brake indicator light 88 and the audible warning indicator 92.

Failure mode and fault detection is managed by the park fault management logic circuit 28, and the powertrain control module 40, which has an onboard diagnostic strategy capability. The powertrain control module 40 also communicates with the park fault management logic circuit 28 through signal line 50.

Although we have described here a particular parking mechanism, shown in FIG. 3, the actuator motors can be designed to act as well upon other types of transmission park brake mechanisms. We have shown a park pawl and park gear with an operating cam merely for the purpose of describing one embodiment of the invention that is commercially successful.

The transmission range selector assembly, which is the driver's range selector interface with the electronically actuated park system, could replace the conventional shift lever and the associated hardware generally used in automotive vehicles. The driver interface could be a rotary switch, a linear action lever or even push buttons. It may be packaged on the vehicle dash panel or console, for example, where it would be ergonomically designed to meet the comfort needs of the customer and the interior design theme for the vehicle.

The transmission range selector sensor 34 provides a unique, seven-bit, parallel, digital signal at 122 for each range and park position that is indicated on the transmission range select control; i.e., P, R, N, D, 3 and L. The selector 34 monitors when the driver moves the range selector "into" or "out of" the park detent position. The output of the park switch 36 is distributed to the park fault management circuit 28, the powertrain control module 40 and to the park controller 44. This provides a redundant check to ensure that the transmission is in the park mode when park is intended.

The transmission park switch 36 senses when the driver moves the transmission range selector control interface "into" or "out of" the transmission park detent position. The output of the switch, indicated at 48, is an input to the park controller 44, to the park fault management device and to the main powertrain control module 40. The transmission park switch 36 provides a redundant check for the digital seven-bit transmission range sensor signal at 122. It also provides a means for operating the system when the main vehicle power is off or is failed. A service brake key interlock solenoid 123 is part of the transmission range selector control assembly 34. The solenoid 123 locks the transmission range selector control in the transmission park position unless the ignition key is turned "on" and the service brake is applied. This arrangement is illustrated schematically in FIG. 6 where the solenoid is shown at 123 and the service brake switch is shown at 124. The ignition key switch 106 is in series with the service brake switch 124. When the switch 102 is closed by the ignition switch key, power is transmitted to the power control module relay 104, thus closing switch 106, allowing power to be distributed through power line 126 to the service brake switch 124. If both switches 124 and 102 are closed, the solenoid 123 releases a mechanical interlock at 128, thereby allowing the range selector shaft 130 to be rotated "out of" the park position shown in FIG. 4.

The electrical override emergency mechanical key switch 100, which receives its power from the auxiliary battery through line 94 as seen in FIG. 1, provides an input to the park controller through line 108 and to the park fault management device, the latter issuing a warning to set the vehicle wheel parking brake, acknowledging that the operator's command is to disengage transmission park due to an emergency for which the normal transmission park logic cannot respond. Such emergency, for example, could be a main battery failure or a powertrain control module failure. Further, the switch input for emergency mechanical key switch 100 is activated only if the operator inserts an object such as a key into a transmission emergency mechanical key switch hole and moves the key switch to the "release park" position. This mechanically overrides the service brake key interlock solenoid 123 so as to disengage it from interlock 128. Further, it is necessary to move the transmission range selector control "out of" the park position, which bypasses the service brake key interlock solenoid 123.

The emergency mechanical override feature can be integrated into the transmission range selector control assembly, if that is desired.

Park controller 44 contains the logic for actuating the two actuator motors 12 and 14 in a clockwise direction or in a counterclockwise direction to achieve an "into park" state or an "out-of-park" state. The park controller incorporates a logic design that can be carried out either with powertrain control module software strategy or with electronic firmware, such as the firmware illustrated in FIG. 2. The inputs for the park controller are the auxiliary battery power in line 94, the electrical override emergency mechanical key switch signal in line 108, the park switch signal in line 48, the parking brake apply switch signal in line 86, the powertrain control module command signal in line 132 and the transmission range selector sensor failure signal.

The actuator motors 12 and 14 are independently-controlled, bi-directional motors. Two motors are used for system redundancy. They act upon the common park brake mechanism 16 and 70. The motors normally act together, but they are driven independently by the park controller. Each actuator motor would have built-in circuit breaker thermal protection. Once the circuit breaker is opened, it would remain in the open state until service is obtained. This would protect against the motor continuously running in the event of a short circuit failure—for example, a shorted park controller output driver failure. Each motor would be designed with enough torque capacity to engage or to disengage the park mechanism without assistance from the second motor.

The sensors, shown at 24 and 26, are needed to retain dual electronic system redundancy. The park position sensors are designed to monitor the position of the park mechanism during its travel to engage park or to disengage park. The sensor 24 is shown in the "in-park" position, as is the sensor 26. When it is in the "in-park" position, motor lead 138 is connected to lead 140 as sensor arm 142 electrically contacts the arcuate conductor for lead 140. When the sensor 24 is in the "out of" park position, an arcuate conductor for lead 144 is electrically connected to the lead 138.

Sensor 26 corresponds to sensor 24 and both move with the park mechanism shaft 60 and gear 58. It includes arcuate contacts that electrically engage sensor arm 146 to establish and disestablish a connection between line 148 and line 150 and to similarly connect line 148 to line 152.

The output of the sensors 24 and 26 is a two-bit digital position code distributed to line 154. A corresponding two-bit digital position code for sensor 26 is distributed to line 156. The signal present in 140 and 144 is the same as the signals in line 154. For convenience, signal line 154 at juncture 158 is shown as a single line, the value of which is determined by the angular position of the arm 142. Similarly, the digital signals in line 156 corresponds at juncture 160 to both the signal in line 152 and the signal in line 150. The digital code in lines 154 and 156 is distributed to a powertrain control module 40 and to the park fault management circuit 28.

A two-bit digital code is established by the sensors 24 and 26 to indicate the position of the arms 142 and 146. For example, the code "01" may indicate the "in-park" position of arm 142; the code "10" may indicate the "out-of-park" position of arm 142; and the code "11" may indicate a position of arm 142 intermediate the "in-park" and "out-of-park" positions where the arm electrically contacts both arcuate conductors.

The sensors 24 and 26 monitor three discrete positions of the park mechanism; i.e., fully "in" park position, fully "out of" park position and an intermediate position. A two-bit digital code, unique to each of the three park positions, is provided by each sensor. A fourth digital code, (i.e., 00) indicates sensor motor or wiring failure. Each park position sensor is wired in series with an actuator motor. Each motor sensor has the dual function of monitoring the travel of the park mechanism and to "turn-off" the actuator motor when it has reached the desired rotation. Additionally, the signals can be monitored as analog signals by the PCM 40 to determine the direction and condition of the motors. Because of the voltage drop at the park controller circuitry and the positioning of the motors and sensors in the circuitry, the PCM can monitor the direction in which the motors are being driven and compare that to the direction commanded. This analog measurement, along with the appropriate strategy at the PCM, can detect motor partial failures as well as complete disconnect failures mentioned above.

The park fault management circuit monitors requests for park developed by the operator. It also monitors the functions that follow such requests. Under normal operation, the park fault management circuit allows removal of the vehicle ignition key from the ignition switch when "into park" is achieved. This is done by sending an output signal to the ignition switch key interlock solenoid 120 seen in FIG. 2. If a system fault occurs in which the actuator motors 12 and 14 are unable to achieve the "into park" state, the park fault management circuit will prevent the vehicle ignition key from being removed from the ignition switch until the driver sets the vehicle wheel parking brake by operating the vehicle wheel parking brake lever 20. If a fault is detected such that vehicle wheel parking is not achieved by the vehicle wheel parking brake mechanism, or cannot be sensed when it is commanded, the vehicle wheel parking brake switch assembly 82 is activated when the park brake lever is operated by the driver. The park fault management circuit will "turn on" the apply park brake light and the audible warning indicator, shown respectively at 88 and 92 in FIG. 3 until the vehicle is secured by means of the parking brake 22.

The park fault management circuit includes an "and" gate 162. This gate has two inputs. The first input, shown at 164, is energized if there is a system fault detected by other logic, not specifically disclosed here. The other input, shown at 86, is energized if the vehicle wheel parking brake switch is closed. If the park brake switch is not closed, the system fault signal will be delivered directly to the "or" gate 168, which will issue a warning signal to lead 90, thus activating the apply park brake light 88 and activating the audible warning indicator 92. If a system fault is detected at lead 164 by the park fault management circuit 28, another "and" gate 170 will distribute a signal to lead 172 if the park brake lead 86 is activated. If both inputs for the gate 170 are activated, the lead 174 for by the "or" gate 176 is energized. If park is achieved, input 178 for the "or" gate 176 will be energized. This will activate the ignition switch key interlock solenoid 120, allowing the driver to remove the ignition key.

If a system fault occurs in which the actuator motors are unable to achieve an "into" park state, the park fault management circuit prevents the vehicle ignition key from being removed until the driver sets the vehicle wheel parking brake. The park fault management circuit will turn on the "apply park brake" light 88 and the audible warning device 92, as indicated above. A vehicle parking brake switch input is sent to the park fault management circuit through lead 86. Once the vehicle wheel parking brake is applied, the park fault management device will command an output signal in lead 174 energized the ignition switch key interlock solenoid 120 to release the vehicle ignition key.

The park fault management device also monitors the system to detect an "out of" park emergency electrical override request from the driver. This would be done, for example, if there is a main battery failure. If the electrical override emergency mechanical key switch input is received from line 108, the park fault management circuit will "turn-on" the apply park brake light 88 and issue an audible warning at 92, which requires the vehicle wheel parking brake to be set to secure the vehicle before the transmission park. A separate "and" gate 180 is used to deliver a signal to "or" gate 168, enabling it to issue a warning signal through line 90 if lead 108 is activated by the driver. If the vehicle wheel parking brake is not applied, no signal exists in line 86. The lack of a signal in line 86 and the presence of a signal in line 108 result in the issuance of a warning signal in line 90 through the "or" gate 168. After "out-of-park" has been achieved by means of the emergency override 100, the transmission park brake may be released as desired by the driver without additional system warnings.

The auxiliary battery power supply 46, in the absence of a main vehicle battery voltage supply, will control the electronically actuated park system. The auxiliary battery then would power the park fault management device 28, the park controller 44, the parking brake switch 82, the electrical override emergency mechanical key switch 100 and park switch 36 conditions. Under "key off" conditions, the auxiliary battery allows the driver to achieve "into" park as controlled by the park logic. An "out of" park condition is allowed to function on the auxiliary battery power (i.e., main battery failed) only with the electrical override emergency mechanical key switch activated and the vehicle wheel parking brake set.

If the auxiliary battery is dead, the rectifying diodes 98 will permit the main vehicle battery to provide the power to operate the electronically actuated park system. Preferably, the park fault management device 28 will monitor the auxiliary battery charge and issue a warning to the driver by signaling the powertrain control module 40 to activate the transmission control light 112.

The ignition switch key interlock solenoid either allows or disallows the driver to remove the vehicle key from the ignition switch. The state of the ignition switch key interlock solenoid is controlled as an output of the park fault management circuit 28 by reason of the signal line 174.

Service brake switch 124 senses the application of the service brake for the vehicle wheels by the driver. Opening or closing switch 124 with key power "on" deactivates or activates the service brake key interlock solenoid 120.

The display circuit 110 receives an output from the powertrain control module 40, thus providing a park selection feedback to the driver during normal operation that would designate the appropriate range selector position chosen by the operator. In the case of a system fault, the "P" for park will flash if a selected position other than "P" were made, but the system remains in park. Also, the appropriate R, N, D or L range designation will flash if a position is selected but that state is not achieved.

The transmission control light 112 also is an output of the powertrain control module. This light illuminates whenever a fault is detected in the transmission control system, including the electronically actuated transmission park pawl-gear system, and the fault is not due to failure of an emission component such as a transmission range sensor. This light also can be used to alert the driver that a partial failure has occurred and preventive maintenance is required; i.e., a sluggish actuator motor or low auxiliary battery voltage.

The malfunction indicator light 114 provides a separate alert to the driver that a component related to an engine exhaust emission characteristic is not operating properly. The "apply park brake" light circuit 88 and the audible warning indicator 92 are activated by an output from the park fault management circuit 28. This light and the audible warning are activated whenever an "into" park has been requested, but not achieved due to a system fault or the "out-of-park" emergency electrical override has not been activated. This light and the audible warning are turned off when the driver vehicle wheel parking brake by activating lever 20.

As explained previously, the inputs for the park controller are the TRS sensor failure or key off condition signal, the output signal from the powertrain control module in line 50, the park switch signal in line 48, the override signal in line 108, the auxiliary battery power in line 94 and the park brake signal in line 86. The outputs, as explained previously, are the outputs to the position sensor 26, as shown at 152 and 150, the lines 140 and 144 for the position sensor 24, the motor lead 182 and the motor lead 184. These leads receive power through the park controller from the main vehicle battery 96 or the auxiliary battery line 94.

If key power is present and a transmission park command is issued, "and" gate 186 of the park controller will transfer an "into park" command to line 188. The "or" gate 190 then will deliver it to the "and" gate 192 and establish an "into park" mode by energizing line 196. If "or" gate 198 does not receive key power or if the transmission range selector sensor does not provide an "intro-park" signal (a failure), and if the "and" gate 200 does not receive a closed park switch signal, the "or" gate 190 will not deliver an "into park" signal at 196. When the park switch is closed and if the "or" gate 198 is not delivering current to the input side of the "and" gate 200, the "or" gate 190 will interrupt delivery of power to lead 196.

If "and" gate 202 receives key power and if an "out of" park command is received, an "out of" park signal is delivered at 204 to "and" gate 206. The signal passes through the "and" gate 206 if a park switch signal is not present at 208. The output of the "and" gate 206 is transferred to the "or" gate 208. The signal passes then to the "and" gate 210 and, if there is no signal in line 212, an "out of" park signal will be delivered to line 214.

If the park switch is not activated, and if the override signal in line 108 is present and if the park brake switch 84 is on, the "and" gate 216 allows an "out of" park command to be transferred through the "or" gate 208 and through the "and" gate 210 to the line 214.

In the case of movement "into park", electrical current to the transmission park motors 12 and 14 from the auxiliary battery power line 94 is monitored at 216. When the position sensor 24 or 26 reach the "in park" position, the wiper arm 142 or 146 will disengage the associated conductor pad of each sensor and the current draw will drop to zero. The monitor 216 will detect a decrease in the current to zero, thereby causing latching circuit 218 to reset field effect transistors 220 and 222 of an "H" driver circuit. This opens the transistor switch. Similarly, when the position sensors 24 and 26 move to their "out of" park positions, the wipers associated with the "in park" position becomes disengaged from the associated conductor pads, interrupting the delivery of auxiliary battery power to the motors. This latches the circuit 232, causing field effect transistors 224 and 226 to open. When the latching circuit 218 and 232 are reset, the switches of field effect transistors 220, 222, 224 and 226 are opened. The latching circuits at 218 and 232 will hold the field effect transistors open until a change in input signals at 196 or 214 is sensed.

The current monitor makes certain that the applicable latching circuit 218 and 232 remains latched until current drops to zero. The circuits 218 and 232 are unlatched as soon as the motor current drops to zero.

OVERVIEW

As seen from the foregoing, we have provided a closed loop electronic control system for engaging and disengaging the transmission park mechanism by means of transmission park controller logic, transmission park fault management interaction and powertrain control module interaction. It is characterized by triple redundancy. That is, there are two redundant electronic subsystems, including feedback monitoring, plus interaction with the parking brake subsystem. Park can be engaged by means of a park controller when the powertrain control module is not powered up, such as during key off conditions. Park can be disengaged by the park controller by means of an electrical override mechanical key switch in the event of an emergency.

Our improved electronically actuated park control system is capable of controlling the actuator motors, which in turn engage or disengage the transmission park mechanism without the use of a complex mechanical cable or a linkage system. This feature makes possible the use of additional vehicle interior styling space by eliminating the need for a shift lever assembly and the external transmission cables and linkages that would be associated with it. A smaller and more ergonomically desirable transmission range selector control interface then can be packaged into the vehicle, thus providing greater flexibility for vehicle design and interior design. For example, it makes possible left-hand drive to right-hand drive vehicle conversions without major manufacturing and tooling changes.

Having described a preferred embodiment of the invention, what we claim and desire to secure by U.S. Letters Patent is:

1. An automatic transmission park control system for a wheeled vehicle having a transmission with multiple operating ratio ranges and a park mode, said transmission including a driver-adjustable range selector having a discrete operating position corresponding to said park mode;

said transmission having a driven shaft, a transmission park means for holding said driven shaft including a movable park mechanism having a transmission park engage position and a transmission park release position;

first and second redundant reversible electric actuators drivably connected to said transmission park means;

a source of voltage for said actuators; and electronic circuit means for controlling power distribution from said voltage source to said actuators whereby said transmission park mechanism is moved into and out-of-park;

said electronic circuit means including an electronic vehicle powertrain control microcomputer powered by said voltage source comprising output portions connected to said actuators, and input portions connected to said range selector whereby movement of said range selector to said transmission park mode position develops an input signal for said input portions;

a park switch means actuated by said range selector for developing a redundant park input signal for said input portions;

means for engaging said transmission park means in the absence of a voltage supply from said output portions connected to said actuators; and means for disengaging said transmission park means independently of said voltage source;

said microcomputer comprising means for comparing a park command signal of said range selector to said signal developed by said park switch and for developing an error signal in response to absence of correspondence of said park command signal and said park switch signal.

2. The automatic park control system as set forth in claim 1 wherein said said comparing means compares said park command signal of said range selector to said signal developed by said park switch and for developing an error code indicative of a failure of said actuators to achieve said park mode following a park command by said range selector.

3. The automatic park control system as set forth in claim 2 including mechanical, driver-operated parking brake means for holding the vehicle wheels independently of operation of said actuators thereby providing added functional redundancy to said automatic park control system.

4. The system set forth in claim 3 comprising means for overriding said park engage positions including a driver-operated mechanical key switch means for developing an override signal at said actuators when said driver-operated parking brake means is applied and said redundant park input signal is not present.

5. The system as set forth in claim 1 wherein said source of voltage comprises a main vehicle power supply battery, an auxiliary power supply battery, a parallel diode circuit means for normally connecting said main battery to power actuated transmission park control system components and for connecting said auxiliary battery thereto upon failure of supply power from said main battery.

6. An automatic transmission park control system for a wheeled vehicle having a transmission with multiple operating ratio ranges and a park mode, said transmission including a driver-adjustable range selector having a discrete operating position corresponding to said park mode;

said transmission having a driven shaft, a transmission park means for holding said driven shaft including a movable park mechanism having a transmission park engage position and a transmission park release position;

first and second redundant reversible electric actuators drivably connected to said transmission park means;

a source of voltage for said actuators; and electronic circuit means for controlling power distribution from said voltage source to said actuators whereby said transmission park mechanism is moved into and out-of-park;

said electronic circuit means including an electronic vehicle powertrain control microcomputer powered by said voltage source comprising output portions connected to said actuators, and input portions connected to said range selector whereby movement of said range selector to said transmission park mode position develops an input signal for said input portions;

a park switch means actuated by said range selector for developing a redundant park input signal for said input portions;

means for engaging said transmission park means in the absence of a voltage supply from said output portions connected to said actuators;

means for disengaging said transmission park means independently of said voltage source;

said microcomputer comprising means for comparing a park command signal of said range selector to said signal developed by said park switch and for developing an error signal in response to absence of correspondence of said park command signal and said park switch signal, each of said actuators including a park motion feedback sensor means for monitoring engagements and disengagements of said transmission park mechanism and for developing sensor input signals for said microcomputer whereby a transmission park command indicated by said range selector is compared to a transmission park response; and means for developing a diagnostic signal indicative of a failure of said actuators to respond to said command by said range selector.

7. The system as set forth in claim 6 wherein said microcomputer comprises means for comparing a transmission park command signal of said range selector to developing an error code indicative of a failure of said actuators to achieve said park mode following a transmission park command by said range selector.

8. The system as set forth in claim 6 including mechanical, driver-operated parking brake means for holding the vehicle wheels independently of operation of said actuators thereby providing added functional redundancy to said automatic park control system.

* * * * *